US 7,784,956 B2

(12) United States Patent
Cohen

(10) Patent No.: US 7,784,956 B2
(45) Date of Patent: Aug. 31, 2010

(54) GAZING GLOBES AND OTHER ORNAMENTAL OBJECTS INCLUDING LIGHT SOURCES AND LIGHT-ACTIVATED MATERIALS

(75) Inventor: Richard Cohen, Ann Arbor, MI (US)

(73) Assignee: RSR Industries, Inc., Ann Arbor, MI (US)

(*) Notice: Subject to any disclaimer, the term of this patent is extended or adjusted under 35 U.S.C. 154(b) by 76 days.

(21) Appl. No.: 11/472,716

(22) Filed: Jun. 22, 2006

(65) Prior Publication Data

US 2007/0030666 A1  Feb. 8, 2007

Related U.S. Application Data

(60) Provisional application No. 60/693,361, filed on Jun. 23, 2005.

(51) Int. Cl.
*F21V 9/16* (2006.01)
*F21L 4/02* (2006.01)

(52) U.S. Cl. ............... 362/84; 362/800; 362/186; 362/809; 362/811

(58) Field of Classification Search .......... 362/34, 362/84, 800, 186, 363, 809, 811, 806, 153, 362/153.1, 145

See application file for complete search history.

(56) References Cited

U.S. PATENT DOCUMENTS

| | | | | |
|---|---|---|---|---|
| 1,359,581 A | * | 11/1920 | Dodds | .............. 375/352 |
| 2,459,693 A | * | 1/1949 | Gordon | .............. 250/483.1 |
| 4,015,111 A | * | 3/1977 | Spector | .............. 362/34 |
| 4,400,162 A | * | 8/1983 | Rustemis | .............. 434/291 |
| 4,757,625 A | | 7/1988 | Watkins | |
| 4,841,416 A | | 6/1989 | Doss | |
| 4,970,793 A | | 11/1990 | Atamian | |
| 5,833,349 A | * | 11/1998 | Apple | .............. 362/84 |
| 6,039,453 A | * | 3/2000 | Wang | .............. 362/101 |
| 6,479,936 B1 | | 11/2002 | Martinez | |
| 6,871,972 B2 | | 3/2005 | Ju | |
| 2003/0079387 A1 | * | 5/2003 | Derose | .............. 40/544 |
| 2004/0136177 A1 | | 7/2004 | Lewis et al. | |
| 2004/0136179 A1 | | 7/2004 | Lewis et al. | |
| 2005/0003120 A1 | * | 1/2005 | Kao | .............. 428/34.1 |
| 2006/0012978 A1 | * | 1/2006 | Allsop et al. | .............. 362/183 |
| 2006/0114671 A1 | * | 6/2006 | Cranor et al. | .............. 362/228 |

* cited by examiner

*Primary Examiner*—Sandra L O'Shea
*Assistant Examiner*—Danielle Allen
(74) *Attorney, Agent, or Firm*—Gifford, Krass, Sprinkle, Anderson & Citkowski, P.C.

(57) ABSTRACT

A light source is used to extend the operating period of light-activated materials in gazing globes and other decorative or ornamental objects. A gazing globe according to the invention includes a hollow glass globe supported on a stand. Photoluminescent, fluorescent or phosphorescent material is deposited on, or embedded in, the globe. A light-emitting diode (LED) is supported within the globe to activate the material. A solar cell is used to charge one or more batteries, and a light detector is used to switch power from the battery to the source of light when a sufficient level of darkness is detected. A violet or ultraviolet LED may be used as the light source, with the solar cell is supported on the stand. The material deposited on, or embedded in, the globe may intentionally glow in a swirling pattern when activated.

3 Claims, 2 Drawing Sheets

GAZING GLOBES AND OTHER ORNAMENTAL OBJECTS INCLUDING LIGHT SOURCES AND LIGHT-ACTIVATED MATERIALS

REFERENCE TO RELATED APPLICATION

This application claims priority to U.S. Provisional Patent Application Ser. No. 60/693,361, filed Jun. 23, 2005, the entire content of which is incorporated herein by reference.

FIELD OF THE INVENTION

This invention relates generally to decorative objects and, in particular, gazing globes and other ornamental objects including light sources and light-activated materials.

BACKGROUND OF THE INVENTION

Pending U.S. Patent Application Ser. No. 20050003120 describes a method of fabricating glow-in-the-dark gazing globes or other objects, as well as the articles that result. The method comprises the steps of providing a hollow form having an inner wall made from a transparent or translucent material, the form including an aperture for gaining access to the interior thereof, and introducing one more photoluminescent pigments into the form through the aperture so that they cling to the inner wall. In alternative embodiments, the pigments may be applied without an adhesive, as by naturally cling, vacuum evaporation, or other techniques. If the object is a gazing globe, a supporting stand may be included. A plurality of different pigments may be introduced into the form to create a decorative or swirling effect. One drawback with the approach just described is that after a few hours following sundown, the light-emitting capabilities of these materials falls off, resulting in a product which no longer glows as nighttime continues.

SUMMARY OF THE INVENTION

This invention improves upon the existing art by providing a light source to extend the operating period of light-activated materials in gazing globes and other decorative or ornamental objects. In the preferred embodiment, a photoluminescent material, which may be phosphorescent or fluorescent, is included on or in the object. A light source of an appropriate wavelength causes the material(s) to glow for a longer period of time after the sun has gone down. Also in the preferred embodiment, a solar cell is used to charge a battery during the day, allowing for a completely self-contained system. A photocell is used to turn the light source on and off, thereby limiting illumination to dark periods, conserving battery power.

A gazing globe according to the invention includes a hollow glass globe supported on a stand. Photoluminescent, fluorescent or phosphorescent material is deposited on, or embedded in, the globe. A light-emitting diode (LED) is supported within the globe to activate the material. A solar cell is used to charge one or more batteries, and a light detector is used to switch power from the battery to the source of light when a sufficient level of darkness is detected. A violet or ultraviolet LED may be used as the light source, with the solar cell is supported on the stand. The material deposited on, or embedded in, the globe may intentionally glow in a swirling pattern when activated.

DETAILED DESCRIPTION OF THE INVENTION

Figure 1:
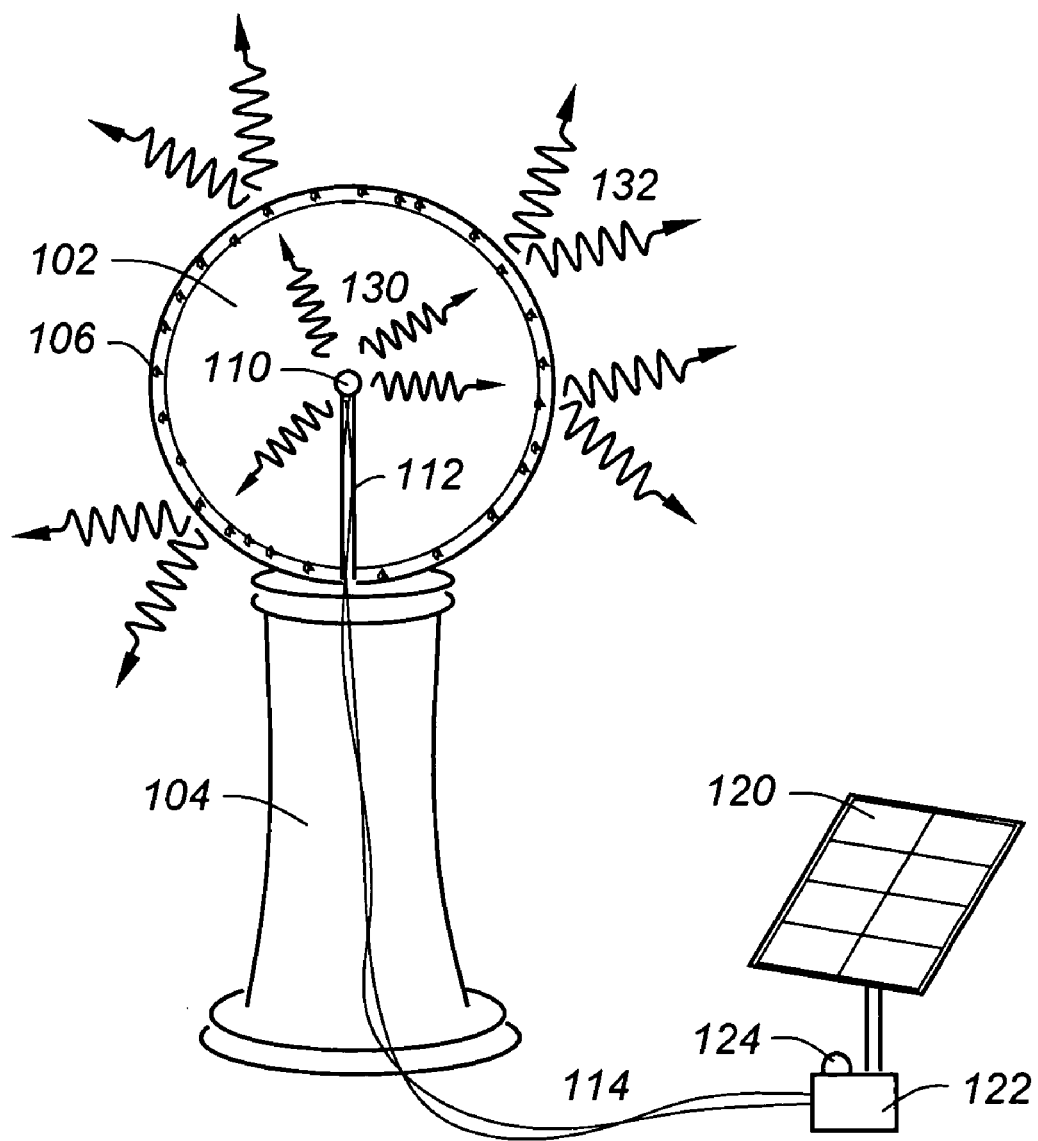
FIG. 1 is a drawing which shows the invention applied to a gazing globe.

FIG. 1 is a drawing which shows the invention applied to a gazing globe with the understanding that the principles and methods described herein are equally applicable to other indoor/outdoor decorative fixtures, which will be apparent to those of skill in the art.

The device includes a globe 102 which may be solid or hollow, including particles 106 which receive light 130 from one or more sources 110, and emit light 132 after the light source has been removed. Such glow-in-the-dark substances may be photoluminescent, phosphorescent, fluorescent, etc. These substances may either be embedded with the sphere 102, or applied to the interior or exterior surfaces thereof, by whatever appropriate means are available. In the event that the globe 102 or other ornamental object is glass, the particles 106 may be included into the melt prior to solidification, or adhered to the inside of the globe (or outside of the globe) through appropriate adhesives. Suitable plastics, including polycarbonates, may be used as an alternative to glass. The globe 102 or other object is preferably supported on a stand 104. The light-activated materials may be applied to create a swirling effect when activated.

The light source 110 is used to provide wavelengths to activate the particles 106, typically after sunset. While the light source 110 may be used externally to the globe 102, in the preferred embodiment, it is held upright by a post 112 central to the inside of a hollow object, allowing for a relatively uniform illumination of the particles 106 while, at the same time, providing for a relatively discrete placement of the source 110. Although different wavelengths may be used, emitter 110 is preferably a violet or ultraviolet light-emitting diode (LED), which are now commercially available with quite high brightness levels. Utilizing common photo-active materials, light in this wavelength range causes the particles 106 to glow quite brightly, and assuming sufficient illumination during the day, this may achieve a glow-in-the-dark effect all night long in some cases. Although a single emitter 110 is shown, clearly multiple emitters may be used, including emitters closer to the particles 106.

Figures 2, 3:
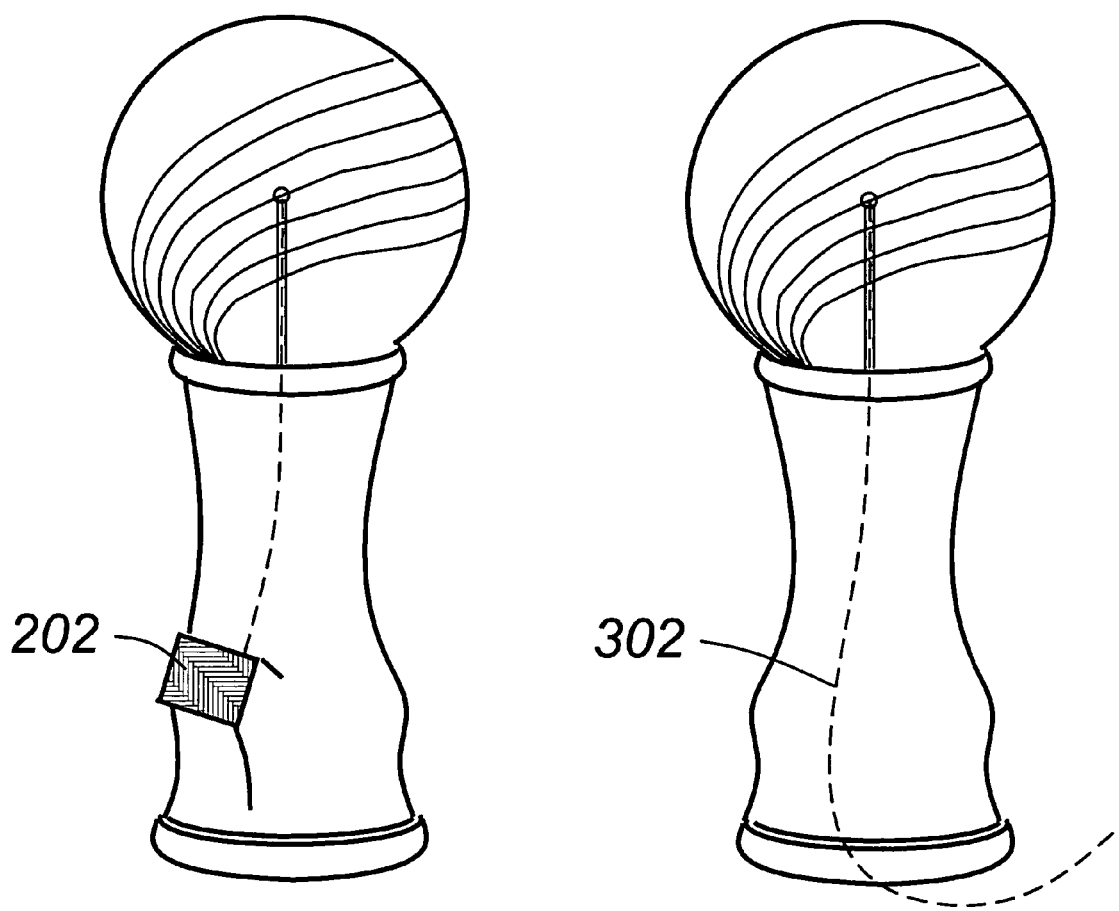
FIG. 2 is a drawing which shows how the solar panel and battery may be integrated into a stand.
FIG. 3 is a drawing which shows how power may be supplied from a more distant source.

In the preferred embodiment, the source 110 is powered by an integrated module 202 built into the stand, as shown in FIG. 2. The module contains the solar panel, battery and necessary electronics. Preferably, a light sensor is used, switching power from the batteries to the source 110 after a sufficient level of darkness has been achieved. This photocell may be located anywhere on the stand. In an alternative embodiment, a module 122 may provide power wires 114, allowing solar panel 120 to be located remotely from the ornamental object. In this case, a light sensor 124 may be mounted on the module. As a further alternative, power may be supplied from a more remote source through wires 302 shown in FIG. 3, allowing for ON/OFF operation from a house, for example, without the need for a solar panel.

I claim:

1. A decorative article, comprising:

a single, hollow, air filled glass globe supported on a stand, the globe having an inner surface;

photoluminescent, fluorescent or phosphorescent particles adhered to the inner surface of the globe, the particles being operative to glow in response to wavelengths in the ultraviolet range of the spectrum;

an ultraviolet light-emitting diode (LED) disposed within the globe to activate the particles;

a solar cell;

a battery charged by the solar cell; and a light detector to switch power from the battery to the source of light when a sufficient level of darkness is detected.

2. The ornamental article of claim 1, wherein the solar cell is supported on the stand.

3. The ornamental article of claim 1, wherein the particles glow in a swirling pattern when activated.

* * * * *